United States Patent Office 3,354,123
Patented Nov. 21, 1967

---

3,354,123
AROMATIC POLYAMIDES CONTAINING THE BENZOPHENONE NUCLEUS
Paul Winthrop Morgan, West Chester, Pa., assignor to E. I. du Pont de Nemours and Company, Wilmington, Del., a corporation of Delaware
No Drawing. Filed June 17, 1963, Ser. No. 288,479
7 Claims. (Cl. 260—65)

This invention relates to novel polymers and to shaped structures prepared therefrom. More specifically, it relates to high molecular weight aromatic polyamides having unusually high melting points having adequate solubility to permit use of their solutions in forming shaped structures.

Polyamides have found wide commercial acceptance because they can be formed into strong abrasion-resistant fibers and films. As is well known to those skilled in the art, several desirable properties, notably high temperature softening point and resistance to high temperature degradation have been achieved in but few polyamides known to the art. For example, polyamides disclosed in U.S. 2,130,948 have relatively low melting points, and degrade rapidly in the presence of air at temperatures as low as 200° C. More important, they lose a substantial portion of their strength at temperatures much lower than their melting points. Polyamides disclosed in U.S. 2,244,- 192 show little tendency to crystallize to a dimensionally-stable structure, soften at temperatures considerably below their melting points and exhibit an undesirable amber color which renders them unsuitable for many purposes. Cold-drawn filaments prepared from these polyamides tend to retract or shrink at temperatures considerably below their melting points due, in part, to lack of crystallinity, and degrade rapidly at their melting temperatures. There had been a need for high molecular weight polyamides which are strong and stable at high temperatures and suitable for forming into filaments and films having water-white clarity.

It is an object of this invention to produce a new and useful class of high molecular weight aromatic polyamides formable into films and filaments by economical processes.

Another object is to provide an aromatic polyamide having inherent viscosity of at least 0.6 which has relatively high solubility in commercial solvents.

These and other objects will become apparent from the following specification and claims.

In accordance with the present invention, there is provided a linear, fiber-forming, synthetic polycarbonamide wherein recurring carbonamide linkages are an integral part of the polymer chain from the class consisting of a homopolymer and a copolymer, the said homopolymer and copolymer consisting of recurring units of the class consisting of

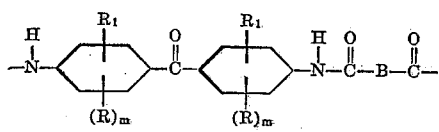

and

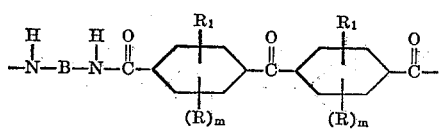

wherein B is a divalent radical from the class consisting of

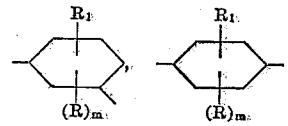

and

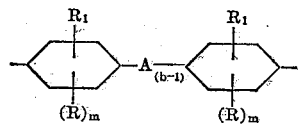

and wherein the hexagon represents the benzene nucleus, A is a divalent radical from the class consisting of $-SO_2-$,

and $-CH_2-$, $b$ is a number of from one to two inclusive, R is a monovalent, nuclear carbon substituent from the class consisting of hydrogen, halogen, lower alkyl, lower alkoxy, and carbalkoxy; $R_1$ is a monovalent nuclear carbon substituent from the class consisting of carboxy and R, and $m$ is a number from zero to two inclusive.

High molecular weight polymers of this invention are prepared by solvent polymerization by reacting an aromatic diacid chloride with an aromatic diamine, the chain-extending bonds being meta or para oriented on each ring, at low temperatures (below 100° C.). This process is described in detail in U.S. 3,063,966 to Kwolek, Morgan and Sorenson (Nov. 13, 1962).

Polymers of this invention are characterized by an exceptionally high melting point. Whereas known polyamides melt at temperatures below about 270° C., generally the polyamides of this invention have melting points in excess of 375° C. Moreover, filaments of polyamides of this invention retain their filament form at temperatures of about 300° C. Polymers of this invention are also distinguished from known polyamides in having excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures, and are readily crystallizable.

The following examples illustrate the invention. All parts and percentages are by weight unless otherwise indicated. Unless otherwise indicated inherent viscosity reported in the examples is determined in sulfuric acid (sp. gr. 1.841 at 60° F.), at 30° C. at a concentration of 0.5 gram polymer per 100 cc. of solution. All polymers of this invention have an inherent viscosity of at least about 0.6 on this basis and a melting point of at least about 375° C.

*Example 1*

In a home blender (1-qt. size) are placed 2.163 g. of m-phenylenediamine, 4.240 g. of sodium carbonate, and 100 ml. of water. A solution of 5.405 g. of 4,4'-benzophenone dicarbonylchloride in 75 ml. of anhydrous tetrahydrofuran is added with vigorous stirring. The mixture is stirred for 5 min., an equal volume of water is added, and the precipitated polymer is collected and washed. The yield of dry polymer is 6.45 g. It does not melt below 375° C. and clear, flexible films are cast from solution in dimethylacetamide.

Example 2

Bis(4-aminophenyl)sulfone (2.483 gms.) and 2.985 gms. of diethylaniline are dissolved in 50 ml. of dimethyl tetramethylene sulfone in a round-bottomed flask equipped with a stirrer. The flask is then immersed in an ice-water bath and cooled with stirring. To this solution is added incrementally 2.703 gms. of 4,4'-benzophenone dicarbonyl chloride and the mixture stirred for a total of one hour in the bath. It is then stirred overnight at room temperature.

The polymer is isolated by pouring the reaction mixture into vigorously-stirred water. After collection, thorough washing and drying, there is obtained a good yield of a product having an inherent viscosity of 0.75, which does not melt below 400° C.

Example 3

The manipulative procedure of Example 2 is followed using 1.98 g. (0.01 mole) of bis(4-aminophenyl)methane, 3.07 g. (0.01 mole) of 4,4'-benzophenonedicarbonylchloride and 25 ml. of dimethylacetamide.

Inherent viscosity in dimethylacetamide plus 5% (by wt.) of LiCl is 1.54. Polymer melt temperature is above 400° C. Clear, flexible films are dry-cast from the reaction mixture and from the DMA–LiCl mixtures. The solvents are removed at 100° C. in a forced draft oven and the salt is removed by washing with water.

Fibers are prepared by dissolving 14 g. of polymer ($\eta$ inh 2.84) in 132 g. of a 5–95 (by wt.) mixture of lithium chloride in dimethylacetamide and dry-spinning. The dry fibers are water-extracted and drawn 2.25× at 340° C.

The yarn has the following properties:

| Temperature of Test, °C. | T, g.p.d. | E, Percent | Mi, g.p.d. | Den. | Tex. |
| --- | --- | --- | --- | --- | --- |
| 21 | 3.6 | 22 | 30 | 2.7 | 3.0 |
| 150 | 3.1 | 19 | 27 | 2.7 | 3.0 |
| 250 | 2.4 | 27 | 19 | 3.6 | 4.0 |

Fiber which has been held at 250° C. for 72 hrs. T/E/Mi at 21° C. of 2.3/14.5/53.

Example 4

4,4'-diaminobenzophenone (10.62 g.), 16.25 ml. of diethylaniline, and 200 ml. of 2,4-dimethyltetramethylene sulfone are placed in a flask equipped for stirring. Isophthaloyl chloride (10.15 g.) in 40 ml. of the same solvent is added over a period of 1 hr. Residual acid chloride is rinsed in with 10 ml. of solvent. At the end of 2 hrs. reaction time, the viscous solution is diluted with 150 ml. of acetone and poured into vigorously stirred water. The fibrous particles of polymer are collected, washed and dried.

The polymer (18.67 g.) has an inherent viscosity of 1.26 ($H_2SO_4$) and does not melt below 400° C. It is readily soluble in tetrahydrofuran-water (90–10 by wt.), formic acid, dimethylformamide, N-methylpyrrolidone, and dimethyl sulfoxide.

Fibers are prepared by dry-spinning. After extraction with water, they are drawn 2.5× in an atmosphere of steam at 40 p.s.i. and have T/E/Mi/den. values of 3.1 g.p.d./23%/28 g.p.d./3.4.

Among the starting materials suitable for preparing polymers of this invention are included (A) diamines such as benzidine, m-phenylene diamine, p-phenylene diamine, bis(4-aminophenyl)sulfone, bis(4-aminophenyl)methane, 2,2-bis(4-aminophenyl)propane, 4,4'-diaminobenzophenone, 4-methyl-m-phenylene diamine, 2,6-dimethyl-p-phenylene diamine, 3,3'-dimethyl benzidine, p-xylylene diamine, the carboxy, carbalkoxy, chloro, bromo and lower alkoxy analogues of each and the like and (B) diacid halides such as isophthaloyl chloride, terephthaloyl chloride, 4,4'-dibenzophenonedicarbonyl chloride, 5-butylisophthaloyl chloride, bis(4-chlorocarbonyl phenyl)-sulfone, bibenzoyl chloride and the like. Copolymers of these reactants and those employed in the specific examples can be made in any proportion by mixture of appropriate diamines and/or acids. In addition, up to about 10% polymer-forming ingredients which may or may not contain an aromatic nucleus can be included without seriously detracting from the extraordinary physical and chemical properties of the polymers of this invention. Typical aliphatic copolymerizable starting materials include diamines such as ethylene diamine, tetramethylene diamine, hexa-methylene diamine, decamethylene diamine and the like and dibasic acids such as malonic, adipic, and sebacic. Preferably, however, the diamine and diacid compounds utilized will be wholly aromatic, thus resulting in a polymer characterized entirely by structural units with all of the nuclei containing aromatic radicals. Typical aromatic copolymerizable starting materials include diamines such as m-phenylene diamine, p-phenylene diamine, 2,6-dichloro-p-phenylene diamine, bis(4-aminophenyl)methane, 3,3'-dichlorobenzidine, p-xylylene-diamine and the like and dibasic acid chlorides such as those of isophthalic, terephthalic, bis(4-carboxyphenyl)sulfone, bis(4-carboxylphenyl)ether, bibenzoic acid and the like. In addition, alicyclic copolymerizable starting materials such as hexahydro-p-phenylene diamine and hexahydroterephthalic acid chloride as well as heterocyclic materials such as piperazine and the like may be employed. The nature of the linking radical in the chain is not critical in the copolymeric component of the chain and may be other than carbonamide. For instance the linkage of the copolymeric component may be sulfonamide (by substituting a disulfonic acid for a minor proportion of dicarboxylic acid), ester by (substituting a glycol for a minor proportion of diamine), urethane (by substituting a bischloroformate for a minor proportion of dicarboxylic acid) or urea (by substituting phosgene for a minor proportion of dicarboxylic acid).

The polymers of this invention have unusually high melting points and are more readily soluble in available solvents than are the corresponding polycarbonamides prepared from single-ring diamines and di-acyl halides. Their solutions in salt-free, amide solvents are very stable to heat, withstanding exposure to high temperatures for periods which would lead to serious gelation of solutions of the simple aromatic polycarbonamides in which such solubility and solution stability has been obtained only with unsymmetrical ring substituents with material sacrifice in melting point. Thus the polymers of this invention provide advantages in commercial manufacture not achievable with the simple aromatic polycarbonamides.

Many equivalent modifications of the above will be apparent to those skilled in the art from a reading of the above without a departure from the inventive concept.

What is claimed is:

1. A linear, fiber-forming, synthetic polycarbonamide wherein recurring carbonamide linkages are an integral part of the polymer chain from the class consisting of a homopolymer and a copolymer, the said homopolymer and copolymer consisting of recurring units of the class consisting of

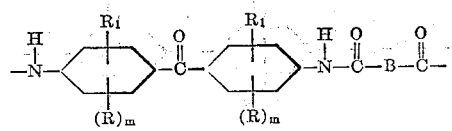

and

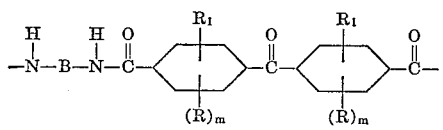

wherein B is a divalent radical from the class consisting of

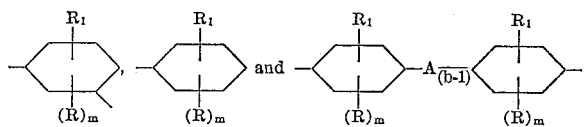

and wherein the hexagon represents the benzene nucleus, A is a divalent radical from the class consisting of —$SO_2$—,

and —$CH_2$—, $b$ is a number of from one to two inclusive, R is a monovalent nuclear carbon substituent from the class consisting of hydrogen, halo, lower alkyl, lower alkoxy, and carbalkoxy, $R_1$ is a monovalent nuclear carbon substituent from the class consisting of carboxy and R, and $m$ is a number from zero to two inclusive, the said polycarbonamide having a melting point of at least about 375° C. and an inherent viscosity of at least about 0.6 in concentrated sulfuric acid at 30° C. at a concentration of 0.5% by weight.

2. The polycarbonamide of claim 1 wherein the recurring unit is

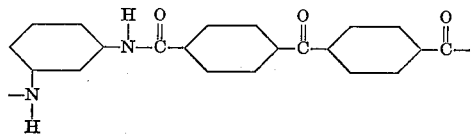

3. The polycarbonamide of claim 1 wherein the recurring unit is

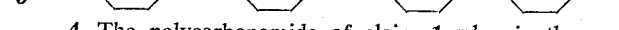

4. The polycarbonamide of claim 1 wherein the recurring unit is

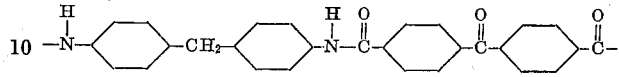

5. The polycarbonamide of claim 1 wherein the recurring unit is

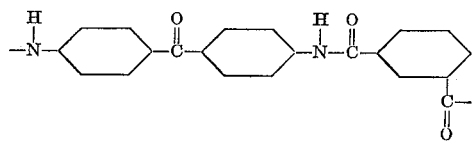

6. A fiber of the polymer of claim 1.
7. A film of the polymer of claim 1.

References Cited

UNITED STATES PATENTS

| | | | |
|---|---|---|---|
| 2,279,752 | 4/1942 | Jacobson | 260—78 |
| 2,831,834 | 4/1958 | Magat | 260—78 |
| 3,094,511 | 6/1963 | Hill et al. | 260—78 |
| 3,179,635 | 4/1965 | Frost et al. | 260—78 |
| 3,190,856 | 6/1965 | Lavin et al. | 260—78 |
| 3,194,794 | 7/1965 | Caldwell et al. | 260—78 |
| 3,206,438 | 9/1965 | Jamison | 260—78 |

FOREIGN PATENTS 737,184  9/1955  Great Britain.

WILLIAM H. SHORT, *Primary Examiner.*

H. D. ANDERSON, *Assistant Examiner.*